(12) United States Patent
Onishi et al.

(10) Patent No.: US 11,091,008 B2
(45) Date of Patent: Aug. 17, 2021

(54) VEHICLE CONTROL DEVICE

(71) Applicant: TOYOTA JIDOSHA KABUSHIKI KAISHA, Toyota (JP)

(72) Inventors: Yoichi Onishi, Okazaki (JP); Nobuharu Kakehashi, Toyoake (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 174 days.

(21) Appl. No.: 15/335,908

(22) Filed: Oct. 27, 2016

(65) Prior Publication Data

US 2017/0182866 A1    Jun. 29, 2017

(30) Foreign Application Priority Data

Dec. 24, 2015 (JP) .............................. JP2015-251972

(51) Int. Cl.
*B60H 1/00* (2006.01)
*F02N 11/08* (2006.01)
*B60H 1/03* (2006.01)
*F02N 19/10* (2010.01)

(52) U.S. Cl.
CPC ..... *B60H 1/00778* (2013.01); *B60H 1/00314* (2013.01); *B60H 1/03* (2013.01); *F02N 11/084* (2013.01); *F02N 11/0829* (2013.01); *F02N 11/0837* (2013.01); *F02N 19/10* (2013.01); *F02N 2200/023* (2013.01); *F02N 2200/0804* (2013.01); *Y02T 10/40* (2013.01)

(58) Field of Classification Search
USPC .......................................................... 237/5
See application file for complete search history.

(56) References Cited

U.S. PATENT DOCUMENTS

| 5,421,169 A | 6/1995 | Benedict |
| 6,105,666 A * | 8/2000 | Tajima ............... B60H 1/00914 165/202 |
| 6,598,671 B1 * | 7/2003 | Zeng .................. B60H 1/00735 165/202 |
| 9,211,777 B2 * | 12/2015 | Hashigaya ......... B60H 1/00764 |

(Continued)

FOREIGN PATENT DOCUMENTS

| JP | H06-219150 A | 8/1994 |
| JP | 2001-341515 A | 12/2001 |

(Continued)

*Primary Examiner* — Kenneth J Hansen
*Assistant Examiner* — John E Bargero
(74) *Attorney, Agent, or Firm* — Oliff PLC

(57) ABSTRACT

The present disclosure provides a vehicle control device including: a fluid circuit, mutually connecting an engine, a vehicle cabin interior heat exchanger for discharging heat into a vehicle cabin interior, and a heat discharging heat exchanger included in a refrigerant cycle in which a refrigerant is compressed and expanded by a compressor, and in which a fluid circulates; and a control unit for controlling the compressor and the engine such that, in a case in which engine warm-up operation ending conditions have not been established and in a case in which predetermined stopping conditions, other than the warm-up operation ending conditions, for stopping engine idling have been established, the compressor is operated while the engine is idling so as to release heat from the refrigerant from the heat discharging heat exchanger and to heat the fluid.

2 Claims, 4 Drawing Sheets

(56) References Cited

U.S. PATENT DOCUMENTS

| | | | |
|---|---|---|---|
| 2006/0048735 A1 | 3/2006 | Umezu et al. | |
| 2010/0095689 A1* | 4/2010 | Shiroyama | B60H 1/00778 62/115 |
| 2013/0054060 A1* | 2/2013 | Dupuy | F02D 17/04 701/22 |
| 2014/0041828 A1* | 2/2014 | Yoshida | B60H 1/00778 165/41 |
| 2015/0174984 A1* | 6/2015 | Jeong | B60H 1/004 701/22 |
| 2015/0298522 A1* | 10/2015 | Hirabayashi | B60H 1/00314 701/36 |
| 2016/0109163 A1* | 4/2016 | Enomoto | F25B 25/005 62/160 |
| 2017/0050493 A1 | 2/2017 | Nishikawa et al. | |
| 2018/0134122 A1* | 5/2018 | Ichishi | F02D 29/02 |

FOREIGN PATENT DOCUMENTS

| | | |
|---|---|---|
| JP | 2004-230936 A | 8/2004 |
| JP | 2004-239082 A | 8/2004 |
| JP | 2008-049876 A | 3/2008 |
| JP | 2010-223161 A | 10/2010 |
| JP | 2014-125014 A | 7/2014 |
| JP | 2015-214308 A | 12/2015 |

* cited by examiner

VEHICLE CONTROL DEVICE

CROSS-REFERENCE TO RELATED APPLICATION

This application claims priority under 35 USC 119 from Japanese Patent Application No. 2015-251972 filed on Dec. 24, 2015, the disclosure of which is incorporated by reference herein.

BACKGROUND

Technical Field

The present disclosure relates to a vehicle control device that controls equipment and the like mounted in an internal combustion engine such as a vehicle engine or in a vehicle.

Related Art

In Japanese Patent Application Laid-Open (JP-A) No. 2010-223161, as a vehicle control system, a control device including an internal combustion engine provided with an idling stop control unit, an early warm-up control unit, a traveling pattern prediction unit, an idling top execution prediction unit, and a determination unit, is proposed. More specifically, in a case in which the engine is running in cold conditions, the vehicle traveling pattern and any idling stop control that is to be executed are predicted, and a determination is made based on the results of the predictions as to whether or not early warm-up control of the engine should be executed. Accordingly, in a case in which the engine is running in cold conditions, early warm-up control that takes into account of both improved fuel consumption due to idling stop control, and deteriorated fuel consumption due to early warm-up control, may be executed.

However, in JP-A No. 2010-223161, since idling stop is not implemented in a case in which a warm-up operation has not yet ended, it is desirable for idling stop to become possible at an early stage.

SUMMARY

The present disclosure to provide a vehicle control device that may, in cold conditions, shorten the time required to reach a state in which idling stop is possible.

A first aspect of the present disclosure is a vehicle control device including: a fluid circuit, mutually connecting an engine, a vehicle cabin interior heat exchanger for discharging heat into a vehicle cabin interior, and a heat discharging heat exchanger included in a refrigerant cycle in which a refrigerant is compressed and expanded by a compressor, and in which a fluid circulates; and a control unit for controlling the compressor and the engine such that, in a case in which engine warm-up operation ending conditions have not been established and in a case in which predetermined stopping conditions, other than the warm-up operation ending conditions, for stopping engine idling have been established, the compressor is operated while the engine is idling so as to release heat from the refrigerant from the heat discharging heat exchanger and to heat the fluid.

According to the first aspect, in a fluid circuit in which a fluid circulates, an engine, a vehicle cabin interior heat exchanger, and a heat discharging heat exchanger that is included in a refrigerant cycle are mutually linked together. Namely, since the fluid circulates through the engine, the engine is cooled by the fluid. The fluid is heated by combustion heat from the engine, and the vehicle cabin interior can be warmed by discharging heat from the vehicle cabin interior heat exchanger. Furthermore, due to the fluid circulating through the heat discharging heat exchanger included in the refrigerant cycle, the fluid is able to be heated by the heat discharging heat exchanger.

Further, in a case in which engine warm-up operation ending conditions have not yet been established, and in a case in which the other predetermined stopping conditions, other than the warm-up operation ending conditions, for stopping engine idling have been established, the control unit controls the compressor and the engine such that compressor is operated while the engine is idling so as to release heat from the refrigerant from the heat discharging heat exchanger and heats the fluid.

Accordingly, in a case in which the warm-up operation ending conditions have not yet been established even in a case in which the vehicle has stopped and stopping conditions have been established, the compressor is operated without the engine being stopped so that the fluid is heated by combustion heat from the engine and heat from the heat discharging heat exchanger. Thus, the above first aspect of the present disclosure may heat the fluid more rapidly compared to a case in which the fluid is heated only by combustion heat from the engine. Namely, since the above first aspect of the present disclosure can heat the fluid more rapidly, the time required for the engine warm-up operation may be shortened.

For example, as a fourth aspect of the present disclosure, the warm-up operation ending conditions may be established in a case in which the temperature of the fluid is equal to or higher than a predetermined engine mechanical loss reduction required temperature at which mechanical loss in the engine may be reduced.

In the above fourth aspect, since the warm-up operation can be ended quickly by rapidly heating the fluid, the fourth aspect of the present disclosure may shorten the time required to reach a state in which idling stop is possible in cold conditions.

A second aspect, in the above first aspect, in a case in which the warm-up operation ending conditions are established, the control unit may effect control so as to stop the engine in a case in which the stopping conditions are established, and may effect control such that the engine continuously operates in a case in which the stopping conditions are not established, and may effect control such that the compressor continuously operates so as to keep the temperature of the fluid at a predetermined temperature.

In the above second aspect, the temperature of the fluid may be kept to a temperature in which the warm-up operation ending conditions are established.

A third aspect, in the above aspects, in a case in which the warm-up operation ending conditions are established and the engine is stopped, the control unit may estimate, from a temperature of the fluid and from an external air temperature, a heat discharge amount of the fluid and a heating amount of the fluid received from the heat discharging heat exchanger, and based on the result of the estimation, the control unit may continuously operate the engine in a case in which the heat discharge amount is greater than the heating amount, and may effect control so as to stop the engine in a case in which the heating amount is greater than the heat discharge amount.

In the above second aspect, since repeated turning ON and OFF of the engine in a short time may be prevented, unnecessary consumption of power by the starter motor and the like may be prevented.

According to the above-described aspects, the present disclosure may provide a vehicle control device that may perform efficient warm-up control using a combination of heating using the engine as a heat source and heating using the refrigerant cycle.

BRIEF DESCRIPTION OF THE DRAWINGS

Exemplary embodiments will be described in detail based on the following figures, wherein.

DETAILED DESCRIPTION

Figure 1:
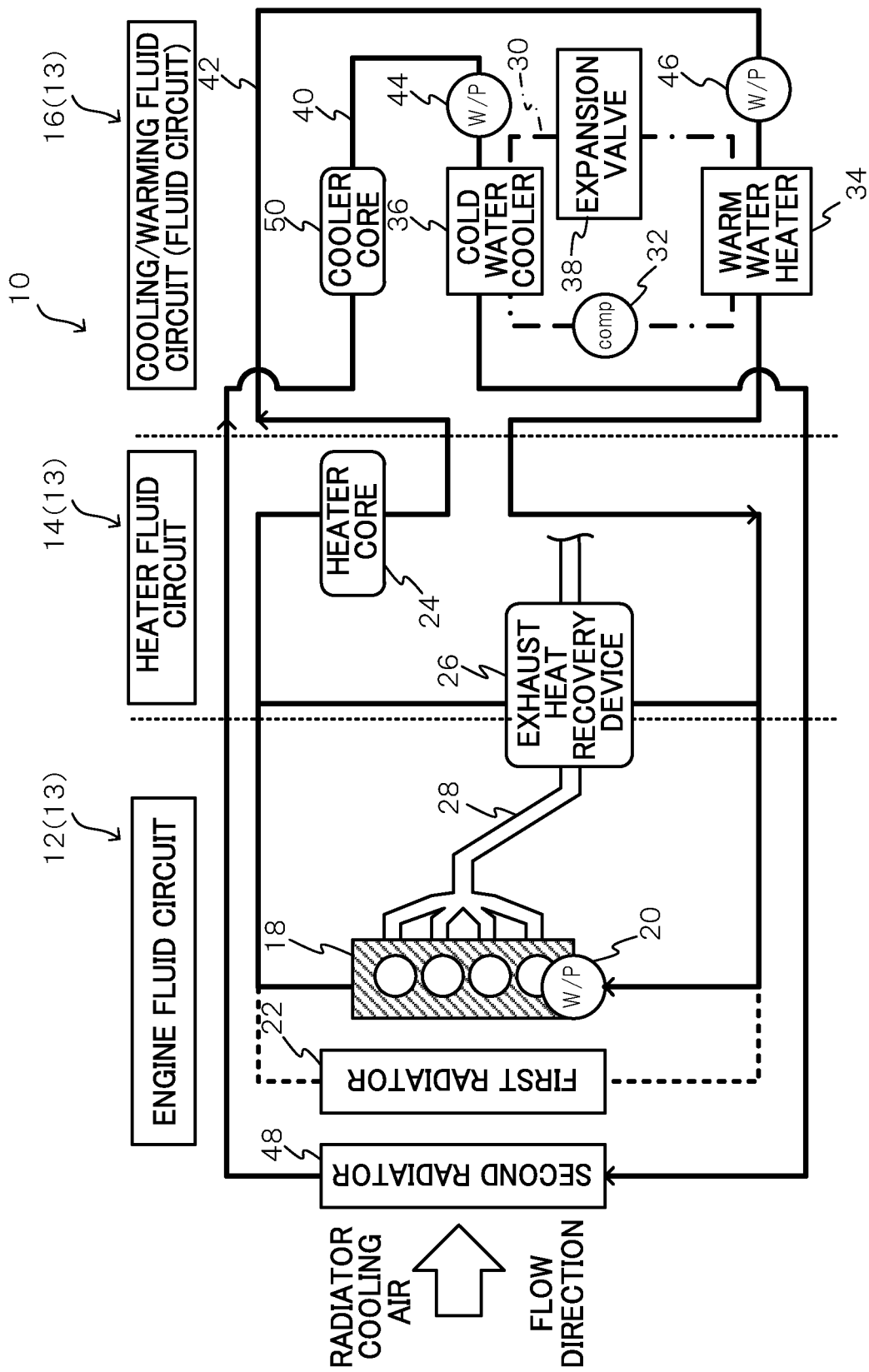
FIG. 1 is a schematic view illustrating a configuration of a vehicle heat utilization device which is a portion of an object controlled by a vehicle control device according to the present exemplary embodiment.

Hereinafter, an example of the present exemplary embodiment will be described in detail with reference made to the drawings. FIG. 1 is a schematic view illustrating a configuration of a vehicle heat utilization device which is a portion of an object controlled by a vehicle control device according to the present exemplary embodiment.

A vehicle heat utilization device 10, which is an object controlled by the vehicle control unit according to the present exemplary embodiment, heats a vehicle cabin interior utilizing heat generated by an engine and the like. Note that, the vehicle heat utilization device 10 according to the present exemplary embodiment is mounted in a vehicle provided with an idling stop function which causes the engine to stop running while the vehicle is stopped at a traffic signal or the like.

As is illustrated in FIG. 1, the vehicle heat utilization device 10 according to the present exemplary embodiment includes a circulation path 13 that serves as a fluid circuit including an engine fluid circuit 12, a heater fluid circuit 14, and a cooling/warming fluid circuit 16, and coolant circulates as the fluid inside the circulation path 13. In the present exemplary embodiment, the engine fluid circuit 12, the heater fluid circuit 14, and the cooling/warming fluid circuit 16 are in mutually communication with each other and coolant circulates there through. Note that, in the present exemplary embodiment, coolant (for example, antifreeze) is used as the fluid, however, it is also possible to use another fluid such as water or the like.

The engine fluid circuit 12 is the portion of the circulation path 13 that cools the engine 18, and the coolant is circulated by an engine water pump (W/P) 20. The coolant circulates inside a water jacket within the engine 18. Moreover, a first radiator 22 is connected via a thermostat (not illustrated in the drawings) to the engine fluid circuit 12, and the coolant is circulated to the first radiator 22 as illustrated by the broken lines in FIG. 1 in accordance with the opening and closing of the thermostat. Namely, at or below a predetermined temperature at which cooling by the coolant becomes necessary, the thermostat is in a closed state and coolant is not circulated to the first radiator 22. Once the predetermined temperature has been exceeded, the thermostat changes to an open state, and the coolant is circulated to the first radiator 22 and heat is discharged. Note that the engine water pump 20 (hereinafter, referred to as an 'ENG water pump 20') of the engine fluid circuit 12 may be a mechanical type of water pump that is operated by the driving of the engine 18, or may be an electrical water pump that operates electrically. In the present exemplary embodiment, a case in which an electrical water pump is used is described. Moreover, the thermostat that is used may also be either an electrical thermostat or a mechanical thermostat.

The heater fluid circuit 14 is the portion inside the vehicle cabin of the circulation path 13 of the coolant that cools the engine 18. The heater fluid circuit 14 is connected to the engine fluid circuit 12, and is provided with a heater core 24 that serves as a vehicle cabin interior heat exchanger and an exhaust heat recovery device 26.

The heater core 24 is a heat exchanger that heats the vehicle cabin interior, and is able to heat the vehicle cabin interior by releasing heat from the coolant via the heater core 24.

The exhaust heat recovery device 26 is provided partway along the path of an exhaust pipe 28 that expels exhaust gas from the engine 18, and heats the coolant using heat from the exhaust pipe 28. Namely, the exhaust heat recovery device 26 can heat the coolant using recovered heat, and use this heat to heat the vehicle cabin interior. Note that, in the present exemplary embodiment, an example in which the exhaust heat recovery device 26 is provided is described, however, it is also possible for the exhaust heat recovery device 26 to be omitted.

The cooling/warming fluid circuit 16 is the portion of the circulation path 13 where the coolant circulates along the circulation path that passes through the heat exchanger included in a refrigerant cycle 30. The cooling/warming fluid circuit 16 is connected to the heater fluid circuit 14, and heats or cools the coolant via the heat exchanger included in the refrigerant cycle 30.

More specifically, the refrigerant cycle 30 includes a compressor 32 that serves as a compressor, a warm water heater 34 that serves as a heat exchanger for radiation heat, a cold water cooler 36, and an expansion valve 38. The refrigerant cycle 30 is able to function as a heat pump. Namely, by compressing a refrigerant using the compressor 32, and circulating the refrigerant and expanding the refrigerant by the expansion valve 38, the warm water heater 34 releases the heat of the compressed refrigerant so as to heat the coolant, and the cold water cooler 36 makes the expanded refrigerant to absorb the heat so as to cool the coolant.

More specifically, the cooling/warming fluid circuit 16 includes a cold fluid circuit 40 and a warm fluid circuit 42. The cold fluid circuit 40, which is formed as a circulation path, cools the coolant by passing the coolant through the cold water cooler 36. The warm fluid circuit 42, which is formed as the circulation path 13, heats the coolant by passing the coolant through the warm water heater 34.

A cold water pump 44, a second radiator 48, and a cooler core 50 are provided in the cold fluid circuit 40. By driving the cold water pump 44, coolant is circulated through the cold water cooler 36, the second radiator 48, and the cooler core 50 in sequence. Note that, in a case in which the cooler core 50 is not used, a coolant bypass circuit (not illustrated in the drawings) that enables the coolant to circulate without passing through the cooler core 50 is used. Moreover, the second radiator may instead be placed on the vehicle front side of the first radiator.

The heater fluid circuit 14 is connected to the warm fluid circuit 42, and a warm water pump 46 is also provided in the warm fluid circuit 42. By driving the warm water pump 46, the coolant is circulated.

Note that electric water pumps are used for both the cold water pump 44 and the warm water pump 46.

Figure 2:
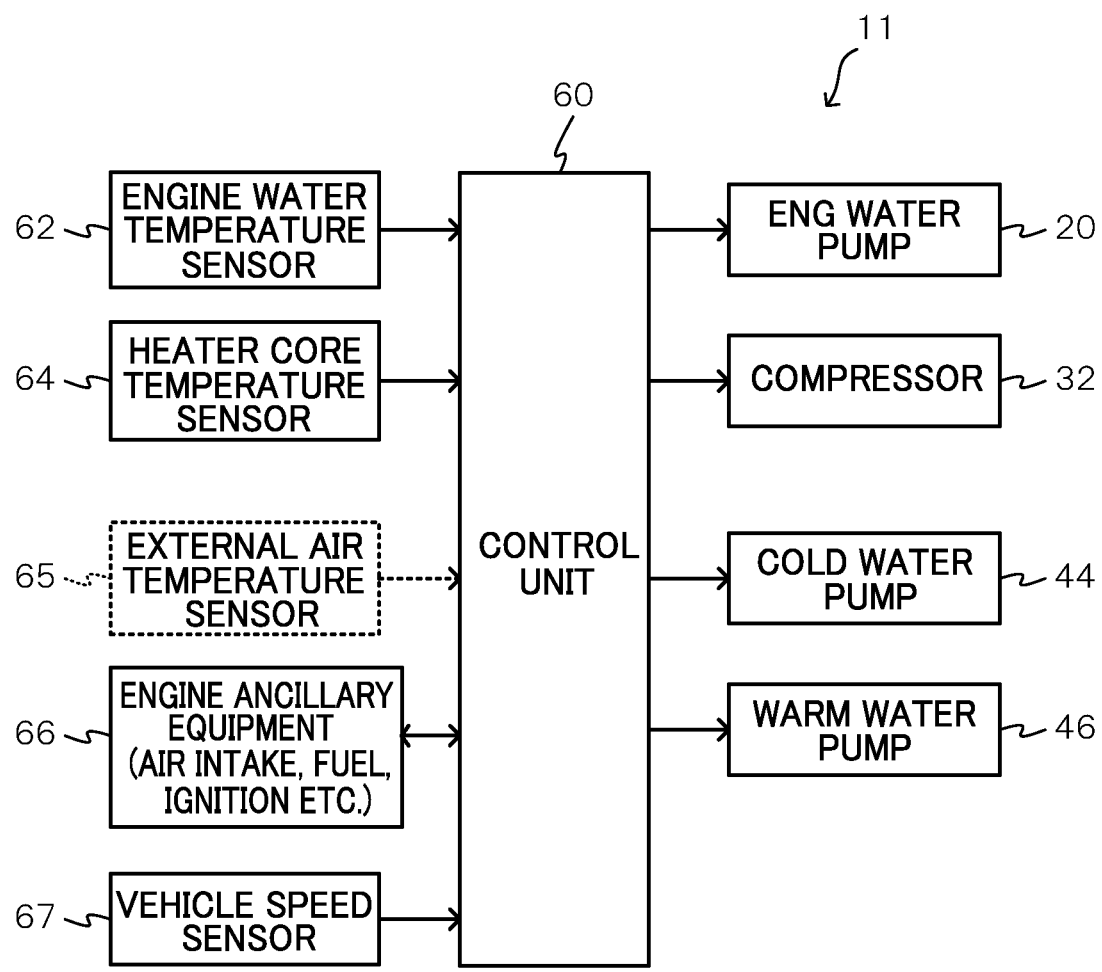
FIG. 2 is a block diagram illustrating the configuration of the vehicle control device according to the present exemplary embodiment.

Next, the vehicle control device according to the present exemplary embodiment will be described. FIG. 2 is a block diagram illustrating the schematic configuration of a vehicle control device according to the present exemplary embodiment.

A vehicle control device 11 according to the present exemplary embodiment includes a control unit 60 that controls operations of the above-described compressor 32, water pumps and the like.

The control unit 60 is configured by a microcomputer that includes, for example, a CPU (Central processing Unit), ROM (Read Only Memory), and RAM (Random Access Memory).

An engine water temperature sensor 62, a heater core temperature sensor 64, an external air temperature sensor 65, engine ancillary equipment 66, and a vehicle speed sensor 67 are connected to the control unit 60.

The engine water temperature sensor 62 detects the temperature of the coolant in the engine 18 (hereinafter, referred to as the 'engine coolant temperature'), and outputs the detection results to the control unit 60. In the present exemplary embodiment, the engine water temperature sensor 62 is provided in the engine block or the like and detects the temperature of the coolant circulating inside the engine 18. For example, the engine water temperature sensor 62 may be provided in the engine block or in a thermostat housing or the like that houses the thermostat, and detects the temperature of the coolant in the engine 18 portion.

The heater core temperature sensor 64 detects the temperature of the heater core 24 or the temperature of the coolant in the heater core 24 portion, or predicts the temperature of the heater core 24 by detecting the temperature of the coolant at the exit portion of the heater core 24 or detecting the temperature of the coolant at the entry portion of the heater core 24, and then outputs the results to the control unit 60. Note that, in the following description, the temperature of the heater core 24 or the temperature of the coolant in the heater core 24 portion is referred to as the heater core temperature.

The external air temperature sensor 65 detects the external air temperature and outputs the detection results to the control unit 60. Note that the external air sensor 65 may also acquire detection results regarding the external air temperature via an air-conditioning ECU or the like that controls an air-conditioning system. Moreover, the external air temperature sensor 65 may be omitted, and thus, is illustrated by a dotted line in FIG. 2.

The engine ancillary equipment 66 includes devices that control the engine 18. Examples thereof are the devices that control the air intake, the fuel, and the ignition. Specifically, the engine ancillary equipment may include a throttle motor that controls the opening and closing of the throttle, an ignition device that controls the ignition, an injector that controls injections of fuel into the engine 18, and a starter motor and the like that is used to start the engine 18. Namely, as a result of the control unit 60 controlling operations of the engine ancillary equipment 66 in order to control the engine 18, operational control of the engine 18 from engine startup to engine shutdown becomes possible, and thus, an idling stop function is implemented.

The vehicle speed sensor 67 detects the vehicle traveling speed (i.e., the vehicle speed) and outputs the detection results to the control unit 60. Accordingly, the control unit 60 can determine whether the vehicle is traveling or is stopped from the detection results from the vehicle speed sensor 67.

In addition, the ENG water pump 20, the compressor 32, the cold water pump 44, and the warm water pump 46 are also connected to the control unit 60.

The ENG water pump 20 is provided in the engine 18. Coolant is circulated along the circulation path 13 in a case in which the ENG water pump 20 is driven.

In a case in which the compressor 32 is driven, the compressor 32 compresses the refrigerant inside the refrigerant cycle 30 and causes the refrigerant to circulate.

In a case in which the cold water pump 44 is driven, the coolant in the cold fluid circuit 40 circulates through the cold water cooler 36, the second radiator 48, and the cooler core 50 in sequence.

In a case in which the warm water pump 46 is driven, the coolant circulates inside the warm fluid circuit 42.

It should also be noted that, in the present exemplary embodiment, as is described above, the vehicle control device is mounted in a vehicle having an idling stop function. Various conditions obtained by commonly known technologies are used for the idling stop conditions, which are previously determined conditions for stopping idling. One of the idling stop condition is whether or not an engine warm-up operation has ended. Since idling stop is not possible in a case in which the engine warm-up operation has not ended. However, it is desirable for idling stop to become possible at an earlier stage so that fuel consumption may be improved.

Therefore, in the present exemplary embodiment, in a case in which warm-up operation ending conditions have not been established for the engine 18, while other idling stop conditions have been established, the control unit 60 drives the compressor 32 to cause the heat pump to function, and performs temperature increase acceleration control so as to accelerate the temperature increase of the coolant. Accordingly, compared with in a case in which the coolant is heated using combustion heat from the engine 18 only, the present exemplary embodiment may heat the coolant more rapidly to a threshold temperature that serves as one of the conditions for ending a warm-up operation.

Furthermore, in a case in which the warm-up operation for the engine 18 has ended, the engine 18 is stopped by the idling stop function. However, in the present exemplary embodiment, the control unit 60 continues to operate the heat pump and performs temperature maintenance control to maintain the coolant temperature that ends the warm-up operation.

Note that, as idling stop conditions other than the warm-up operation ending condition, various known conditions, for example, detecting whether or not a vehicle has stopped, such as the vehicle speed, the brake switch, the shift position, the parking brake, and the like, may be applied. Moreover, as a measure for determining whether or not the warm-up operation ending conditions have been established, for example, determining whether the temperature of the coolant is equal to or more than an engine mechanical loss reduction required temperature, which is determined in advance and is the temperature at or above which mechanical loss can be reduced in the engine 18 (for example, 40° C. or the like), may be applied.

Here, specific conditions for performing the temperature increase acceleration control and the temperature maintenance control will be described. Note that, in the following description, TH denotes the heater core temperature that is detected by the heater core temperature sensor 64, and TE denotes the engine coolant temperature that is detected by the engine water temperature sensor 62. Moreover, T1 denotes a heater required temperature that is determined in advance and is the temperature at which the coolant can function as a heat source for the heater (for example, 60° C. or the like), and T2 denotes the predetermined engine mechanical loss reduction required temperature (T1>T2).

In the above-described temperature increase acceleration control, specifically, in a case in which TH<T1, and TE<T2, the compressor 32 is operated and the heat pump is made to function so as to reduce mechanical loss in the engine 18, irrespective to whether the vehicle is stopped or traveling. Accordingly, even in a case in which the vehicle has stopped and idling stop conditions have been established, the present exemplary embodiment may end the warm-up operation early, since the engine 18 is not stopped and the coolant is heated by the heat pump function.

Moreover, in the above-described temperature maintenance control, specifically, in a case in which the vehicle is stopped, the engine 18 stops in a case in which TH<T1 and TE≥T2. However, the compressor 32 continues to operate and causes the heat pump to function continuously. As a result of the heat pump functioning continuously, the temperature of the coolant can be held at or above the engine mechanical loss reduction required temperature T2. Moreover, in a case in which TH≥T1, and TE≥T2, the compressor 32 is stopped in a case in which the vehicle stops, and in a case in which the idling stop conditions are established, the engine 18 is also stopped. Accordingly, the present exemplary embodiment may minimize the mechanical loss while the engine is in operation, may control the engine 18 to operate as little as possible in a case in which the motive power of the engine 18 is not needed, and may improve fuel consumption.

Note that, T1 and T2 are used as threshold values. However, in order to prevent chattering in the determination, hysteresis may be provided in each of the threshold values T1 and T2, and a threshold value for a case in which the temperature is increasing and a threshold value for a case in which the temperature is reducing may be provided.

Hereinafter, a case in which the control unit 60 executes processing that includes both temperature increase acceleration control and temperature maintenance control will be described as an example. However, note that the control unit 60 may perform one out of the above controls.

Figure 3:
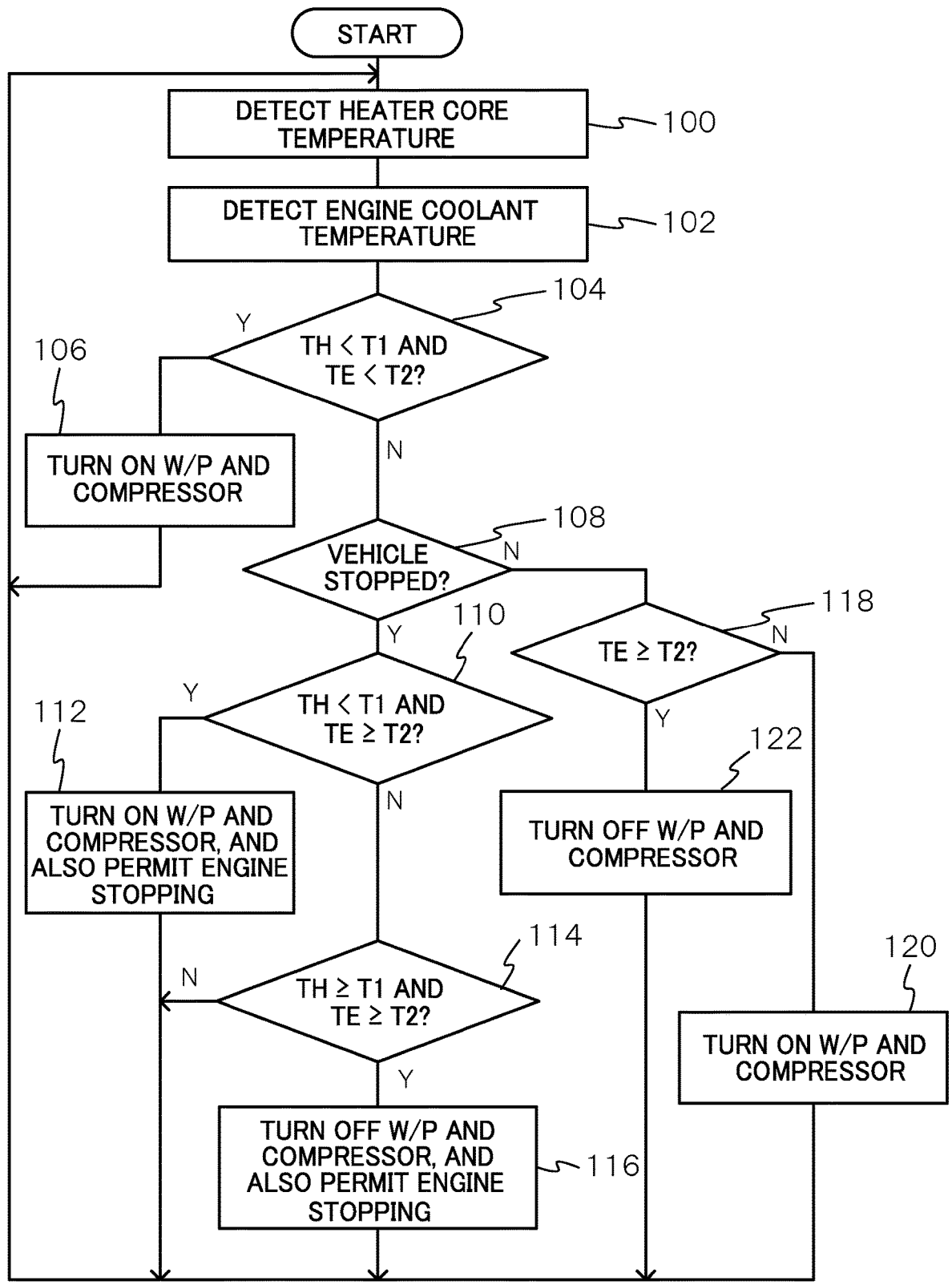
FIG. 3 is a flowchart illustrating a flow of processing performed by a control section of the vehicle control unit according to the present exemplary embodiment.

Next, the specific processing that includes both the above-described temperature increase acceleration control and temperature maintenance control and that is performed by the control unit 60 of the vehicle control device 11 according to the present exemplary embodiment will be described. FIG. 3 is a flowchart illustrating a flow of processing performed by the control unit 60 of the vehicle control device 11 according to the present exemplary embodiment. Note that the processing illustrated in FIG. 3 starts in a case in which an ignition switch (not illustrated in the drawings) is turned ON and the engine 18 starts to operate.

In step 100, the control unit 60 detects the temperature of the heater core by acquiring the detection results from the heater core temperature sensor 64, and proceeds to step 102.

In step 102, the control unit 60 detects the temperature of the engine coolant by acquiring the detection results from the engine water temperature sensor 62, and proceeds to step 104.

In step 104, the control unit 60 determines whether or not the heater core temperature TH acquired in step 100 is lower than the heater required temperature T1, and whether or not the engine coolant temperature TE acquired in step 102 is lower than the engine mechanical loss reduction required temperature T2. In a case in which the result of this determination is affirmative, the process proceeds to step 106. On the other hand, in a case in which the result is negative, the process proceeds to step 108.

In step 106, the control unit 60 performs control to turn ON the W/P (i.e., the ENG water pump 20, the cold water pump 44, and the warm water pump 46) and the compressor 32, and returns to step 100. Namely, in a case in which TH<T1 and TE<T2, since this corresponds to a case in which conditions to end the warm-up operation of the engine 18 are not yet established and the other idling stop conditions are established, the heat pump is made to function and, as well as using the combustion heat from the engine 18, the above-described temperature increase acceleration control is performed in order to heat the coolant. Accordingly, compared with in a case in which the coolant is heated using only the combustion heat from the engine 18, the present exemplary embodiment may heat the coolant more quickly to the warm-up operation ending threshold temperature.

In step 108, the control unit 60 determines whether or not the vehicle is stopped. Whether or not the vehicle is stopped is determined based on the vehicle speed detected by the vehicle speed sensor 67. In a case in which the result of the determination is affirmative, the process proceeds to step 110. On the other hand, in a case in which the result is negative, the process proceeds to step 118.

In step 110, the control unit 60 determines whether or not the heater core temperature TH acquired in step 100 is lower than the heater required temperature T1, and whether or not the engine coolant temperature TE acquired in step 102 is equal to or more than the engine mechanical loss reduction required temperature T2. In a case in which the result of this determination is affirmative, the process proceeds to step 112. On the other hand, in a case in which the result is negative, the process proceeds to step 114.

In step 112, the control unit 60 turns ON the W/P (i.e., the ENG water pump 20, the cold water pump 44, and the warm water pump 46) and the compressor 32, and issues permission for the engine 18 to stop. Finally, the process returns to step 100 and repeats the above-described processes. Namely, in a case in which TH<T1 and TE≥T2, then the engine is stopped in accordance with the other idling stop conditions. However, the above-described temperature maintenance control is performed in order to make the heat pump continue to operate. Accordingly, in the present exemplary embodiment, mechanical loss while the engine is in operation may be minimized, and, in a case in which the motive power of the engine 18 is not needed, may control such that the engine 18 is operated as little as possible so as to achieve improved fuel consumption.

In contrast, in step 114, the control unit 60 determines whether or not the heater core temperature TH acquired in step 100 is equal to or more than the heater required temperature T1, and whether or not the engine coolant temperature TE acquired in step 102 is equal to or more than the engine mechanical loss reduction required temperature T2. In a case in which the result of this determination is affirmative, the process proceeds to step 116. On the other hand, in a case in which the result is negative, the process returns to step 100 and repeats the above-described processes. Note that, in a case in which, in step 110, TH≥T1 and TE≥T2, the result of the determination in step 114 is assumed to be negative, and the determination processing of step 114 may be omitted.

In step 116, the control unit 60 turns OFF the W/P (i.e., the ENG water pump 20, the cold water pump 44, and the warm water pump 46) and the compressor 32, and issues permission for the engine 18 to stop. Finally, the process returns to step 100 and repeats the above-described processes. Namely, in a case in which TH≥T1 and TE≥T2, the engine is stopped in accordance with the idling stop conditions and thus, unnecessary fuel consumption may be suppressed.

In contrast, in step 118, the control unit 60 determines whether or not the engine coolant temperature TE acquired in step 102 is equal to or more than the engine mechanical loss reduction required temperature T2. In a case in which the result of this determination is negative, the process proceeds to step 120. On the other hand, in a case in which the result is affirmative, the process proceeds to step 122.

In step 120, the control unit 60 turns ON the W/P (i.e., the ENG water pump 20, the cold water pump 44, and the warm water pump 46) and the compressor 32, and returns to step 100 and repeats the above-described processes. Namely, although the vehicle is traveling, by operating the compressor 32 and heating the fluid, the present exemplary embodiment may rapidly raise the temperature to the engine mechanical loss reduction required temperature T2, and improve fuel consumption.

In step 122, the control unit 60 turns OFF the W/P (i.e., the ENG water pump 20, the cold water pump 44, and the warm water pump 46) and the compressor 32, and returns to step 100 and repeats the above-described processes. Namely, while the vehicle is traveling, in a case in which TE≥T2, the heat pump is stopped irrespective to the heater core temperature TH. Accordingly, the time required until the heater starting temperature is reached may be longer than in a case in which the compressor 32 is operated and the heat pump is made to function. However, the pump power can be decreased and the combustion heat from the engine can be used to supply heat to the heater. Thus, an improvement in fuel consumption may be achieved.

Note that, in the above-described exemplary embodiment, in a case in which TE≥T2 and idling stop conditions have been established so that the engine 18 is stopped, and in a case in which the engine coolant temperature TE is in the vicinity of T2, there may be cases that, due to environmental conditions, the temperature of the coolant fall immediately to a state in which TE<T2 is reached. In a case in which TE<T2, the engine 18 becomes necessary to be started and the engine is repeatedly turned ON and OFF, and the power consumption by the starter motor and the like increases.

Figure 4:
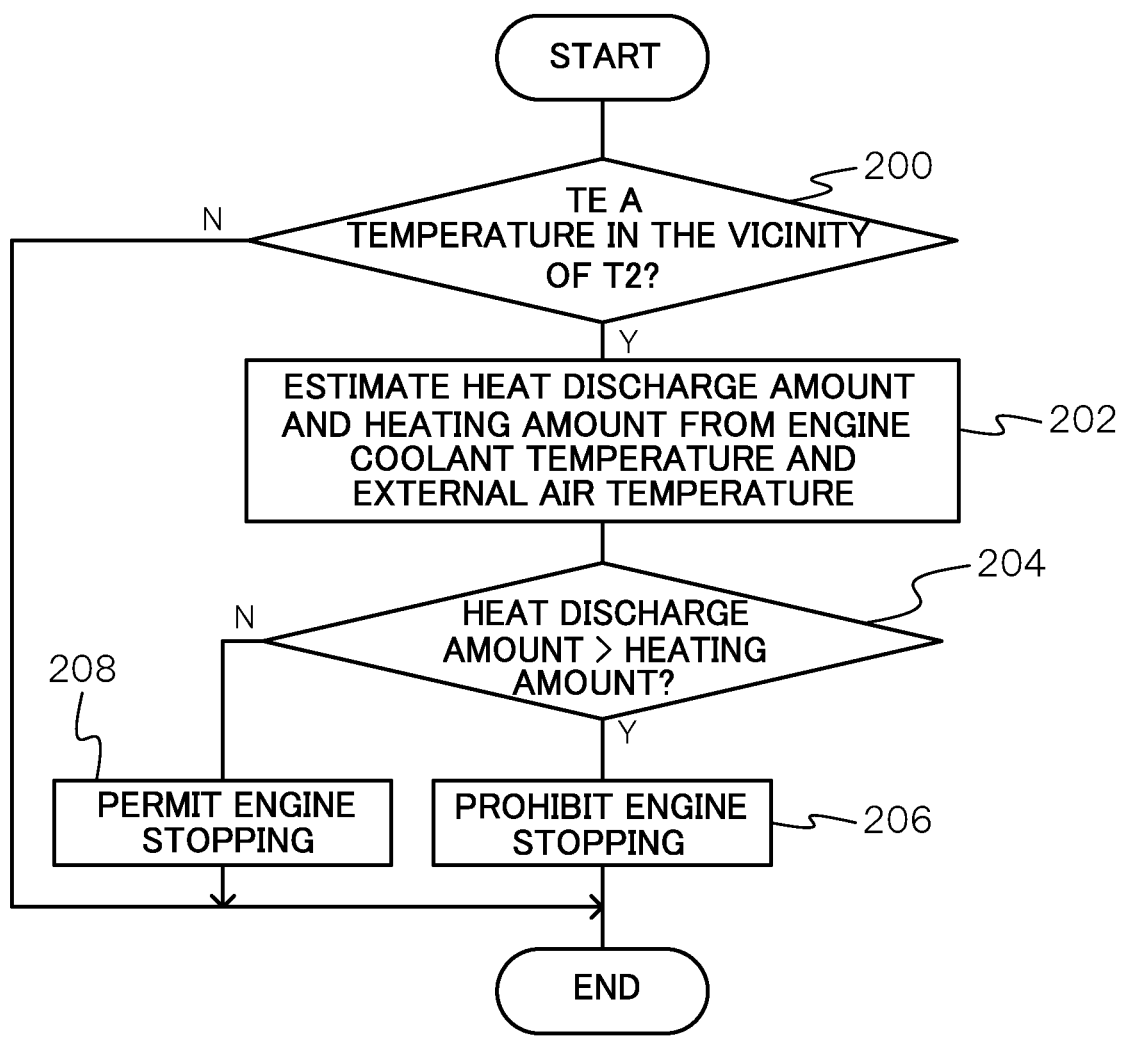
FIG. 4 is a flowchart illustrating a flow of processing performed by the control section in a case in which idling stop conditions have been established and the engine has been stopped.

Therefore, in a case in which the amount of heat discharge and the amount of heat the heat pump can generate (i.e., the heating amount) are estimated from the external air temperature and the temperature of the coolant. In a case in which the estimated amount of heat discharge is greater than the estimated heating amount of the heat pump, the engine 18 is operated continuously without idling stop control being implemented. On the other hand, in a case in which the estimates heating amount of the heat pump is greater than the estimated amount of heat discharge, idling stop control may be implemented. For example, in a case in which idling stop conditions are established in the processing of the above-described step 112 and step 116 and the engine 18 is stopped, then the processing illustrated in FIG. 4 is performed. Hereinafter, the processing illustrated in FIG. 4 will be described. FIG. 4 is a flowchart illustrating a flow of the processing performed by the control unit 60 in a case in which idling stop conditions have been established and the engine has been stopped.

In step 200, the control unit 60 determines whether or not the engine coolant temperature TE is a temperature that is in the vicinity of the engine mechanical loss reduction required temperature T2. In a case in which the result of this determination is affirmative, the process proceeds to step 202. In a case in which the result is negative, the processing is ended. Note that a temperature within a range of, for example, ±several degrees relative to T2 can be used as the temperature that is in the vicinity of the engine mechanical loss reduction required temperature T2. Alternatively, a temperature that has been determined in advance in accordance with the external air temperature may be used.

In step 202, the control unit 60 estimates the amount of heat discharge and the heating amount of the heat pump from the engine coolant temperature and the external air temperature, and proceeds to step 204. Note that this estimation of the amount of heat discharge and the heating amount of the heat pump may be performed by, for example, storing in advance values that have been determined by experiments and the like, and then reading the particular values that correspond to the current coolant temperature and external air temperature and the like.

In step 204, the control unit 60 determines from the estimation results from step 202 whether or not the heat discharge amount is greater than (>) the heating amount. In a case in which the result of this determination is affirmative, the process proceeds to step 206. On the other hand, in a case in which the result is negative, the control unit 60 proceeds to step 208.

In step 206, the control unit 60 prohibits the engine from stopping and ends the processing. Accordingly, in a case in which the coolant temperature immediately drops to a temperature where a warm-up operation is required even in a case in which idling stop conditions have already been established, since the engine is prohibited from stopping, the repeated turning ON and OFF of the engine in a short time may be prevented. As a result of the repeated turning ON and OFF of the engine in a short time being prevented, unnecessary consumption of power by the starter motor and the like may be prevented.

In contrast, in step 208, the control unit 60 permits the engine 18 to be stopped and ends the processing. Namely, in a case in which an idling stop is implemented, since the coolant temperature will not immediately drop to a temperature where a warm-up operation is required, the engine 18 is permitted to stop and unnecessary fuel consumption may be prevented.

Note that, a configuration in which the heater core 50 of the above-described exemplary embodiment is omitted may be employed. Moreover, in the above-described exemplary embodiment, a further heat source (for example, a combustion heater or the like) as the heat source that heats the coolant may be provided.

Moreover, in the above-described exemplary embodiment, a case in which coolant is circulated by providing the ENG water pump 20 and the warm water pump 46, has been described. However, the warm water pump 46 may be omitted and the coolant may be circulated by using the ENG water pump 20 only.

Moreover, in the above-described exemplary embodiment, a case in which the exhaust heat recovery device 26 is provided in the heater fluid circuit 14, has been described. However, the present invention is not limited to this. For example, an EGR (Exhaust Gas Recirculation) device or a transaxle or the like may be provided on the coolant circulation path in the heater fluid circuit 14.

Moreover, the processing performed by the control unit 60 in the above-described exemplary embodiment may be software processing that is implemented as a result of a computer executing a program, or may be processing that is performed by hardware. Alternatively, processing may be implemented using a combination of both software and hardware. The program that is used in a case in which the processing is implemented using software may also be recorded on various types of storage medium and distributed.

It should be understood that the above-described exemplary embodiment is merely an example and the present disclosure is not limited to the foregoing description. Various other modifications, additions, substitutions and the like may be made to the above exemplary embodiment insofar as they do not depart from the spirit or scope of the present disclosure.

What is claimed is:

1. A vehicle control device comprising:
    a fluid circuit, mutually connecting an engine, a vehicle cabin interior heat exchanger for discharging heat into a vehicle cabin interior, and a heat discharging heat exchanger included in a refrigerant cycle in which a refrigerant is compressed and expanded by a compressor, and in which a fluid circulates; and
    a control unit for controlling the compressor and the engine such that:
        when predetermined idling stop conditions are established, an idling of the engine is stopped, the predetermined idling stop conditions including (i) engine warm-up operation ending conditions and (ii) other conditions, wherein
            (i) the engine warm-up operation ending conditions are established in a case in which a temperature of the fluid as measured by an engine water temperature sensor is equal to or higher than a predetermined engine-mechanical-loss-reduction-required-temperature at which mechanical loss in the engine can be reduced, wherein the predetermined engine-mechanical-loss-reduction-required-temperature is lower than a heater-required temperature at which the fluid can function as a heat source to heat the vehicle cabin interior, and
            (ii) the other conditions are established in a case in which a vehicle has stopped; and
        when the engine warm-up operation ending conditions are not established while the other conditions are established by the vehicle having stopped, the compressor is operated and the engine is maintained idling so as to release heat from the refrigerant from the heat discharging heat exchanger and to heat the fluid, wherein
    in a case in which the engine warm-up operation ending conditions are established and the engine is to be stopped, the control unit estimates, from the temperature of the fluid and from an external air temperature, a heat discharge amount of the fluid and a heating amount of the fluid received from the heat discharging heat exchanger, and
    based on the estimation, the control unit continuously operates the engine in a case in which the heat discharge amount is greater than the heating amount, and effects control so as to stop the engine in a case in which the heating amount is greater than the heat discharge amount.

2. The vehicle control device according to claim 1, wherein
    in a case in which the engine warm-up operation ending conditions are established, the control unit effects control so as to:
        (i) stop the engine in a case in which the other conditions are established;
        (ii) continuously operate the engine in a case in which the other conditions are not established; and
        (iii) continuously operate the compressor so as to keep the temperature of the fluid at a preset temperature.

* * * * *